W. S. MYERS.
NUT LOCK.
APPLICATION FILED APR. 26, 1919.

1,351,676.

Patented Aug. 31, 1920.

Inventor
W.S.Myers.
By C.A.Snow & Co.
Attorneys

Witness
J.C.Toomey

UNITED STATES PATENT OFFICE.

WALTER S. MYERS, OF DARBY, PENNSYLVANIA.

NUT-LOCK.

1,351,676.  Specification of Letters Patent.  Patented Aug. 31, 1920.

Application filed April 26, 1919. Serial No. 292,975.

*To all whom it may concern:*

Be it known that I, WALTER S. MYERS, a citizen of the United States, residing at Darby, in the county of Delaware and State of Pennsylvania, have invented a new and useful Nut-Lock, of which the following is a specification.

The present invention relates to nut locks and has as its principal object to provide a nut lock which is positive in action, and which dispenses with locking keys, pawls, and other locking devices.

Another object is to provide a simple and efficient nut lock which is inexpensive to manufacture, which is simple in construction, and which consists of few parts.

With the above and other objects and advantages in view, the invention consists of the general combinations of elements, arrangements of parts, and formations and specific details, all of which will be hereinafter enlarged upon in the following specification and pointed out in the claims at the end thereof, one embodiment of the invention being illustrated in the drawing, wherein:—

Figure 1:
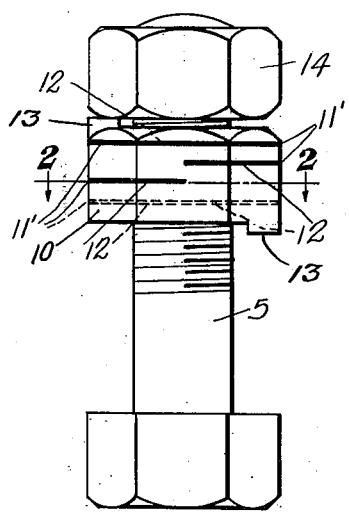
Figure 1 is a side elevation of a lock nut constructed in accordance with my invention and assembled with the bolt.
Figure 2:
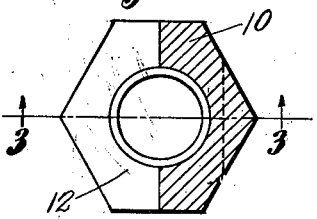
Fig. 2 is a transverse sectional view taken on line 2—2 of Fig. 1.
Figure 3:
Fig. 3 is a transverse sectional view taken on line 3—3 of Fig. 2.

Referring in detail to the drawing wherein like characters of reference designate like parts on all of the views, the numeral 5 denotes a bolt of the usual construction having a nut 10 of usual construction threaded thereon, the nut being provided with the usual bolt-receiving opening and having an annular recess 11 at its outer face.

The nut 10 is provided with parallel slits 11' extending clear through to the threaded bore but not entirely through the same. This manner of forming the parallel slits 11' affords gripping tongues 12 which bind upon the bolt when the nut lock is in set position. These tongues are of such a width as to have a relatively wide gripping surface.

Formed upon the opposite end faces of the nut 10 at opposite sides thereof and extending transversely of these faces are lugs or projections 13. When the nut is assembled upon the bolt, the lug or projection 13 on the under face of the nut jams against the object through which the bolt extends while the superposed nut 14 jams against the lug or projection upon the upper face of the nut 10, thus affording a small space between the two nuts. This manner of forming the nut 10 causes the tongues 12 to bind against the bolt and grip the same at diametrically opposite points. The slits 12 are filled with a soft solder to prevent the nut rusting on the bolt.

This embodiment of the invention is merely illustrative and it is to be understood that the same is subject to minor changes and that my limits of such changes are governed only by what is claimed.

What is claimed is:—

1. In a nut lock, a nut having a bolt-receiving opening and a transverse slit communicating with the opening, the slit being filled with compressible soft, rust-resisting metal.

2. In a nut lock, a nut having a bolt-receiving opening and oppositely projecting transverse slits communicating with the opening, the ends of the nut being provided with lugs projecting substantially parallel to the axis of the opening, each lug being disposed in coöperating relation to that slit which is most remote from the end of the nut whereon said lug is formed.

3. In a nut lock, a nut having a bolt-receiving opening and provided with a transverse slit extended part way across the nut and communicating with the opening, the slit defining a bendable transverse tongue in the nut, the tongue being provided adjacent to its end with a projection extended substantially parallel to the axis of the nut beyond one end face of the nut.

4. A nut lock constructed as set forth in claim 2, and further characterized by the fact that the slits are filled with soft, rust-resisting metal.

In testimony that I claim the foregoing as my own, I have hereto affixed my signature in the presence of two witnesses.

WALTER S. MYERS.

Witnesses:
MARY MYERS,
ANDREW HOUSTON.